(12) United States Patent
Donchev et al.

(10) Patent No.: US 12,724,208 B2
(45) Date of Patent: Sep. 1, 2026

(54) DUST CAP FOR FIBER OPTIC CONNECTORS

(71) Applicant: PPC BROADBAND, INC., East Syracuse, NY (US)

(72) Inventors: Stefan Donchev, Milton Keynes (GB); Sandeep Puliyankulangara, Ernakulam (IN); Pete Carapella, Fayetteville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 106 days.

(21) Appl. No.: 17/872,875

(22) Filed: Jul. 25, 2022

(65) Prior Publication Data

US 2023/0026985 A1 Jan. 26, 2023

Related U.S. Application Data

(60) Provisional application No. 63/225,242, filed on Jul. 23, 2021.

(51) Int. Cl.
*G02B 6/38* (2006.01)

(52) U.S. Cl.
CPC ......... *G02B 6/3849* (2013.01); *G02B 6/3825* (2013.01)

(58) Field of Classification Search
CPC ... G02B 6/3849; G02B 6/3847; G02B 6/3816
See application file for complete search history.

(56) References Cited

U.S. PATENT DOCUMENTS 6,227,717 B1 * 5/2001 Ott ........................ G02B 6/3849 385/139
8,224,144 B2 * 7/2012 Allen ................. G02B 6/44524 385/139
10,241,276 B2 3/2019 Chai et al.
2004/0013388 A1 * 1/2004 Fujiwara ............. G02B 6/3893 385/134
2004/0038558 A1 * 2/2004 Langouet ............ G02B 6/3879 439/53

(Continued)

OTHER PUBLICATIONS

Invitation to Pay Additional Fees and, Where Applicable, Protest Fee dated Oct. 11, 2022 in corresponding International Application No. PCT/US2022/038212, 16 pages.

(Continued)

*Primary Examiner* — Eric Wong
(74) *Attorney, Agent, or Firm* — MH2 TECHNOLOGY LAW GROUP LLP

(57) ABSTRACT

A dust plug for a fiber optic connector includes a plug wall, an alignment member and a ferrule protector. The plug wall includes a first side and a second side. The plug wall may or may not be part of a housing. The alignment member may extend from the first side of the plug wall wherein the alignment member is configured to engage with and be disposed within an adapter. The ferrule protector may extend from the second side of the plug wall wherein the ferrule protector may be configured to receive a ferrule of a fiber optic cable. The ferrule protector, the plug wall, and the alignment member may be configured to block a signal from the ferrule when the ferrule is disposed within the ferrule protector and when the member is inserted into the adapter.

25 Claims, 16 Drawing Sheets

(56) References Cited

U.S. PATENT DOCUMENTS

| | | | | |
|---|---|---|---|---|
| 2004/0264873 | A1 | 12/2004 | Smith et al. | |
| 2012/0328248 | A1* | 12/2012 | Larson | G02B 6/3846 385/81 |
| 2013/0114932 | A1* | 5/2013 | Horibe | G02B 6/3898 385/78 |
| 2013/0272671 | A1* | 10/2013 | Jones | G02B 6/3849 385/139 |
| 2018/0128996 | A1* | 5/2018 | Sawicki | G02B 6/3898 |
| 2020/0319412 | A1* | 10/2020 | Kadar-Kallen | G02B 6/3893 |
| 2022/0276446 | A1* | 9/2022 | Ventrella | G02B 6/387 |
| 2024/0142718 | A1* | 5/2024 | Rosson | G02B 6/3849 |

OTHER PUBLICATIONS

International Search Report and Written Opinion dated Dec. 2, 2022 in corresponding International Application No. PCT/US2022/038212, 17 pages.

* cited by examiner 210, 240
71
40
80
78
76
92
56
58
52'
11
60
54
82

56
52
60
58
54
78
76
92

73
56
52
78
76
92
11
58
60
54

80
78
76
48"
46
46
90
46
42
44
48'
46
46

210, 240
10'''
11
12
13
14
22
26
28
32
34
36
50
51
52
53
70
72
74
84
86
88
98
100
102
104
106

210, 240
220
34
12
19
17
16
38
96
96
212
212
18
20
46
46
46
46
46
46
46
46
48
48
96
96

DUST CAP FOR FIBER OPTIC CONNECTORS

CROSS-REFERENCE TO RELATED APPLICATION

This application claims the benefit of U.S. Provisional Application No. 63/225,242, filed Jul. 23, 2021, the disclosure of which is hereby incorporated by reference herein in its entirety.

TECHNICAL FIELD

The present disclosure generally relates to holders for fiber optic connectors and more specifically relates to holders for fiber optic connectors which are protected by dust caps.

BACKGROUND

Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and fingerprints.

Dust caps may be provided for connectors to protect the polished end face of the optical fiber. However, when such dust caps are in place, the connector is not capable of being received in known optical fiber adapters (see dust cap element 110 in FIG. 1). Alternatively, a connector for a fiber optic cable may be inserted into an inactive or non-functional adapter for storage (proximate to functional/active adapters) until the fiber optic cable will be used by an active/functional adapter. However, while such non-functional storage adapters might provide some protection from contaminants to a single connector inserted into an adapter, these non-functional storage adapters are not as effective as a dust cap in protecting the polished end face of the optical fiber. Moreover, it can be rather challenging to package non-functional storage adapters in the same region as functional active adapters given the limited availability of space for such ports.

Therefore, there is a need to improve the known methods and apparatus for protecting the polished end face of a fiber optic connector within telecommunications equipment from contaminants. It may be desirable to provide a dust cap for a fiber optic connector that is configured to be stored in an adapter and is also configured to be stored in a panel opening such that, regardless of whether the dust plug is stored in a fiber optic adapter or a panel opening, the dust plug is also configured to prevent the polished end face of the connector's ferrule from getting contaminated by dust, fingerprints or other items that might degrade optical signal transmission.

SUMMARY

In one embodiment of the present disclosure, a dust plug for a fiber optic connector may includes a plug wall, an alignment member and a ferrule protector. The plug wall includes a first (or front) side and a second (or rear) side. The plug wall may or may not be part of a housing. The alignment member may extend from the first (or front) side of the plug wall wherein the alignment member is configured to engage with and be disposed within an adapter. The ferrule protector may extend from the second (or rear) side of the plug wall wherein the ferrule protector may be configured to receive a ferrule of a fiber optic cable. The ferrule protector, the plug wall, and the lower alignment member portion are configured to block a signal from the ferrule when the ferrule is disposed within the ferrule protector and when the upper and lower alignment members are inserted into the adapter.

In yet another embodiment of the present disclosure, a dust plug for a fiber optic connector may include a plug wall, an upper alignment member portion, a lower alignment member portion, and a ferrule protector wherein the upper alignment member portion and the lower alignment member portion form an alignment member. The plug wall may include a first side and a second side. The upper alignment member portion may extend from the first side of the plug wall and may be configured to engage with an upper region of an adapter. The lower alignment member portion may also extend from the first side of the plug wall and may be configured to engage with a lower region of the adapter. The ferrule protector may extend from the second side of the plug wall wherein the bore defined in the ferrule protector is configured to receive a ferrule of a fiber optic cable. The plug wall, the ferrule protector, the upper alignment member portion and the lower alignment member portion may form a monolithic piece of unitary construction wherein the aforementioned components may be integral to each other. The ferrule protector, the plug wall, and the lower alignment member portion may be configured to block a signal from the ferrule of a fiber optic cable when the ferrule is disposed within the ferrule protector and when the upper and lower alignment members are inserted into the adapter.

In this embodiment, the upper alignment member portion may be a planar member having an upper side and a lower side. The lower alignment member portion may extends from a lower side of the upper alignment member portion. The upper alignment member portion and the lower alignment member portion may be configured to be friction fitted within the adapter. The lower alignment member portion may also include a central body and a plurality of extensions. The central body may perpendicularly extend in a downward direction from the lower side of the upper alignment member portion. The plurality of extensions may extend away from the central body in each lateral direction.

In yet another embodiment of the present disclosure, a dust plug for a fiber optic connector may include a housing, an alignment member and a ferrule protector wherein the alignment member includes an upper alignment member portion and a lower alignment member portion. In this embodiment, the housing includes a plug wall, a first side wall, a second side wall, a bottom wall, and a top wall wherein the first side wall defines a first aperture and the second side wall defines a second aperture.

The upper alignment member portion may extend away from a first (or front) side of the plug wall may be co-planar with the top wall (or top surface of the housing). The upper alignment member portion may be configured to be received within an upper region of an adapter via a friction-fit. The lower alignment member portion may extend from a lower side of the upper alignment member and may be configured to be received within a lower region of the adapter via a friction fit. The upper alignment member portion may be a planar member having an upper side and the lower side. The lower alignment member portion may include a central body and a plurality of extensions. The central body may perpendicularly extends from the lower side of the upper alignment member portion. The plurality of extensions may extend away from the central body in each lateral direction.

In this embodiment, the ferrule protector may extend from a second (or rear) side of the plug wall into the housing's chamber. The ferrule protector may define a bore that is configured to receive a ferrule of a fiber optic cable via a friction fit engagement. The dust plug may further include a first tab extending from the first side wall and a second tab extending from the second side wall wherein the first and second tabs are configured to retain a fiber optic cable connector via a snap-lock fit. The housing, the upper alignment member, the lower alignment member portion and the ferrule protector form a monolithic piece of unitary construction. Accordingly, the ferrule protector, the plug wall, and the lower alignment member portion are configured to block a signal from the ferrule of a fiber optic cable when the ferrule is disposed within the ferrule protector and when the upper and lower alignment member portions are inserted into the adapter. In this embodiment, the housing may be configured to prevent debris from contaminating the adapter as well as the ferrule. Moreover, the first and second apertures (defined in the first and second side walls respectively) may be configured to retain a distal region of a removal tool for removing the dust plug from an adapter.

In this embodiment, the dust plug may alternatively be used to only protect the ferrule of the fiber optic cable from debris when the dust plug is inserted into a panel opening used for storing the fiber optic cable connector. It is also understood that the lower alignment member portion, the upper alignment member portion and the plug wall define a vertical slot which may be configured to receive a a portion of the wall at the panel opening.

In yet another embodiment of the present disclosure, a dust plug may include a housing, a ferrule protector, and an alignment member which further includes a main body and a biasing portion. The housing includes a plug wall, a first side wall, a second side wall, a bottom wall, and a top wall. The housing may further include a flange which extends from an upper surface of the housing wherein the flange is arranged in a longitudinal direction at the upper surface of the housing. The flange may be configured to prevent the dust plug from rocking/pivoting when the dust plug is inserted into a wall.

A first tab may extend from an upper region of the first side wall and a second tab may extend from an upper region of the second side wall wherein the first and second tabs are configured to retain a fiber optic cable connector via a snap-lock fit. The alignment member may extend from a front side of the plug wall wherein the alignment member is configured to be disposed within an adapter. The ferrule protector may extend from a rear side of the plug wall into the housing wherein the ferrule protector defines a bore that is configured to receive a ferrule of a fiber optic cable via a friction-fit engagement.

The housing, the plug wall, the ferrule protector, and the alignment member form a monolithic piece of unitary construction such that the ferrule protector, the plug wall, and the lower alignment member portion are configured to block a signal from the ferrule of a fiber optic cable when the ferrule is disposed within the ferrule protector and when the alignment member is disposed within the adapter. In this embodiment, the biasing portion of the alignment member may extend from an upper face of the main body (at the distal end of the main body) such that the biasing portion and the main body are configured to be friction fitted within the adapter. In this embodiment, the housing may be configured to prevent debris from contaminating the adapter and/or the ferrule of the fiber optic cable.

BRIEF DESCRIPTION OF THE DRAWINGS

Further advantages and features of the present disclosure will become apparent from the following description and the accompanying drawings, to which reference is made. In which are shown.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
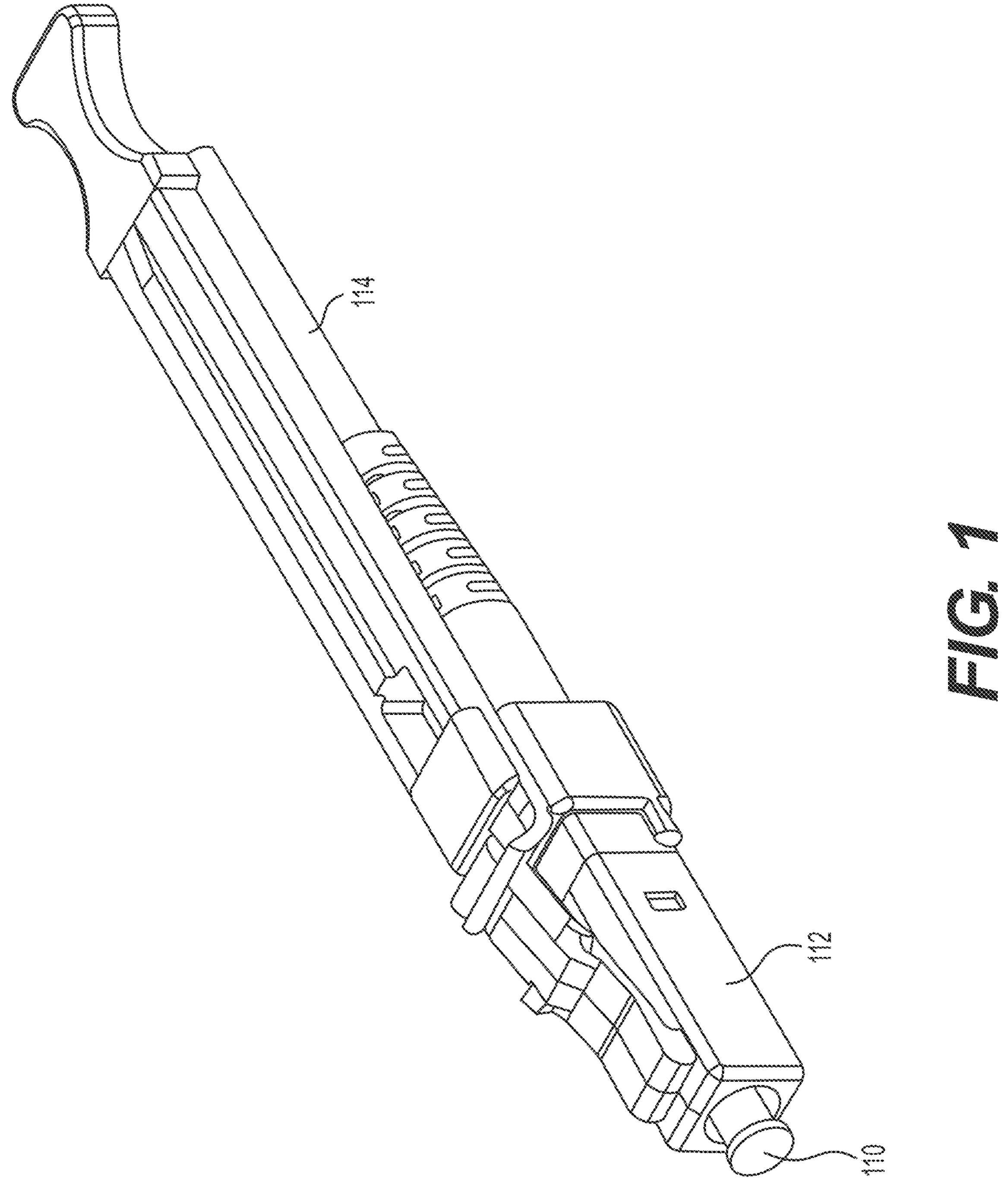
FIG. 1 illustrates a prior art dust plug used on a connector.
Figure 2B:
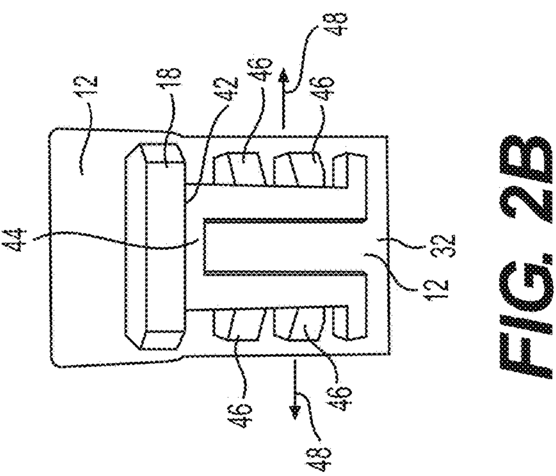
FIG. 2B illustrates a rear view of the dust plug in FIG. 2A.
Figure 2D:
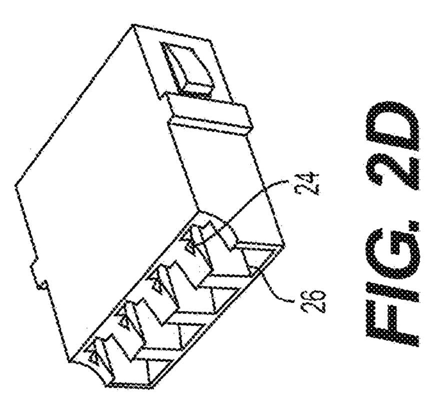
FIG. 2D illustrates an adapter which may be implemented with various embodiments of the present disclosure.
Figure 2A:
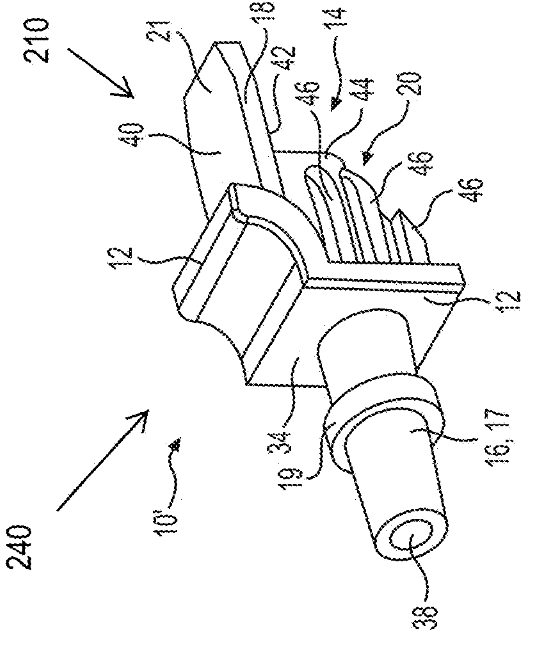
FIG. 2A illustrates a first isometric view of a dust plug according to a first embodiment of the present disclosure.
Figure 2C:
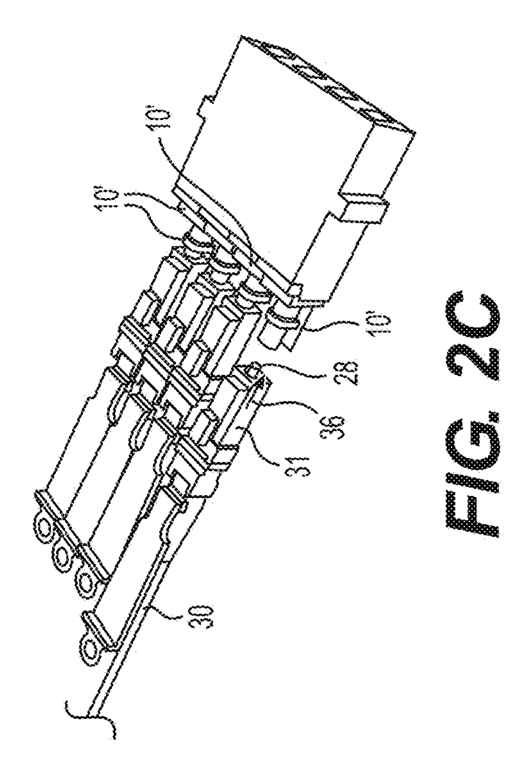
FIG. 2C illustrates a perspective view of the dust plug in FIGS. 2A-2B wherein the dust plug is connected to an active adapter and some connectors are plugged into the dust plugs.

Referring now to FIG. 2A, a dust plug 10' according to a first embodiment of the present disclosure is shown. The dust plug 10' for a fiber optic connector 31 may include a plug wall 12, an alignment portion 220, and a ferrule protector 16 that may extending from the first side of the plug wall and configured to be disposed within an adapter. The alignment portion 220 may include an upper alignment member 14, a lower alignment member portion 20. The ferrule protector 16 may include a tubular structure 17 as shown in FIG. 2A and abutment flange 19. The ferrule protector 16 defines a bore 38 that is configured to receive a ferrule 28 of a fiber optic cable 30. As shown in FIG. 2A, the ferrule protector 16 may include an abutment flange 19 on an outer surface 21 of the ferrule protector 16. The ferrule protector 16 may extend from a second side 32 of the plug wall 12. The plug wall 12 may be a panel (as shown in FIG. 2A) wherein the plug wall 12 has a first (or front) side 32 and a second (or rear side). The upper alignment member portion 18 may extend from the first side 32 of the plug wall 12 wherein the upper alignment member portion 18 is configured to engage with an upper region 24 of an adapter 22 (see FIG. 1D). The lower alignment member portion 20 may also extend from the first side 32 of the plug wall 12 wherein the lower alignment member portion 20 is configured to engage with a lower region 26 of the adapter 22. The upper and lower alignment member portions 18, 20 may be integral to each other (thereby forming a single alignment member 14) as shown in the rear view of the dust plug 10' of FIG. 1 B. The upper and lower alignment member portions 18, 20 are configured to be disposed within the adapter 22 via a friction fit or interference fit as shown in FIG. 2C.

Referring again to FIG. 2A, the ferrule protector 16 may include an abutment flange 19 on an outer surface 21 of the ferrule protector 16. The abutment flange 19 may be configured to abut a portion of the connector 31. The ferrule protector 16 may extend from a second side 32 of the plug wall 12. It is understood that the ferrule protector 16 may also be a block-like structure (not shown) which defines a bore 38 wherein the front surface of the block like structure forms the plug wall 12. The bore 38 defined in the ferrule protector 16 is configured to receive the ferrule 28 of the fiber optic cable 30 which may, but not necessarily be a friction fit between the ferrule 28 and the ferrule protector 16. As shown in the example of FIG. 1A, the ferrule protector 16 (in the form of a tubular member 17) may extend from the second side 34 of the plug wall 12. The bore 38 defined in the ferrule protector 16 is configured to receive the ferrule 28 of the fiber optic cable 30 which.

As shown in FIG. 2A, the plug wall 12, the ferrule protector 16, the upper alignment member portion 18 and the lower alignment member portion 20 may form a monolithic piece 240 of unitary construction. It is understood that the plug wall 12, the ferrule protector 16, the upper alignment member portion 18 and the lower alignment member portion 20 may be formed from a polymeric (non-conductive material) which is either opaque or translucent. Accordingly, the dust plug 10' may be formed via an injection molding process. In the event the dust plug 10' components are formed a translucent polymeric material and the dust plug 10' is disposed on a connector 31 for a fiber optic cable 30, a user/technician would be able to detect if the fiber optic cable 30 is live/active due to light which may be transmitted through the translucent material. Regardless of whether the dust plug 10' is formed from an opaque or translucent material, the plug wall 12 and the lower alignment member portion 20 and the ferrule protector 16 are configured to block a signal 36 from the ferrule 28 of the fiber optic cable 30 when the ferrule 28 is disposed within the ferrule protector 16 and when the single alignment member 14 (upper and lower alignment member portions 18, 20 integral to each other) is inserted into the adapter 22 (see FIG. 2B).

Referring again to FIG. 2A, the upper alignment member portion 18 may be a planar member having an upper side 40 and a lower side 42 so that the planar member may fit within the upper region 24 of the adapter 22. As shown in FIG. 2D, the upper region 24 of the adapter 22 has a slot-like opening. As shown in FIG. 2B, the lower alignment member portion 20 extends from the lower side 42 of the upper alignment member 14. The lower alignment member portion 20 further includes a central body 44 that perpendicularly extends (in a downward direction) from the lower side 42 of the upper alignment member 14. The lower alignment member portion 20 may further include a plurality of extensions 46 (FIG. 2B) which extend away from the central body 44 in each lateral direction 48 as shown in FIG. 2D. The extensions 46 which extend from the central body 44 may be configured to abut the inner side walls of the lower region 26 of the adapter 22 (see FIG. 2D).

Figures 3A, 3B, 3C, 3D:
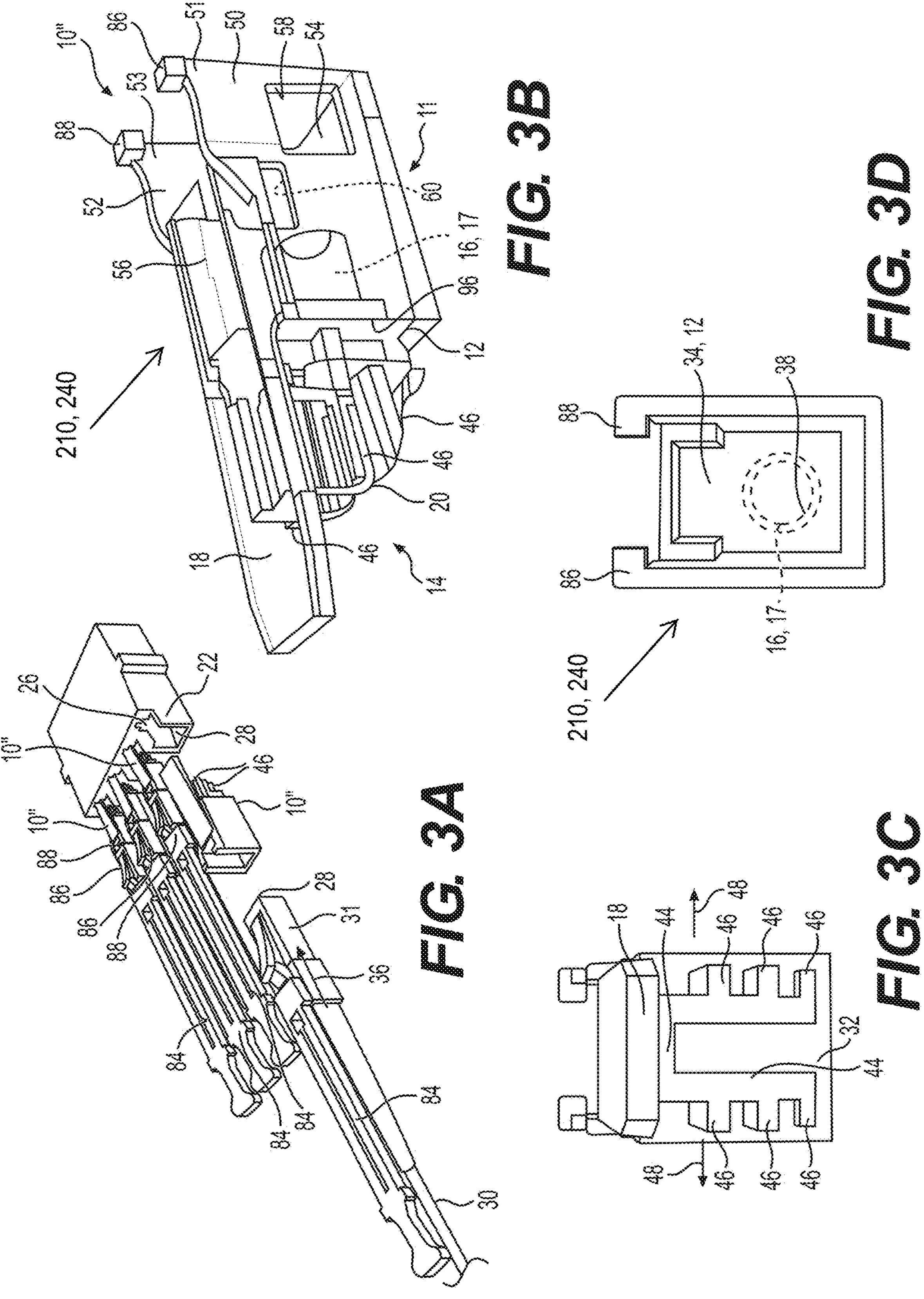
FIG. 3A is a perspective view of a dust plug according to a second embodiment of the present disclosure wherein the dust plug(s) are inserted into adapters.
FIG. 3B is a first isometric view of the dust plug in FIG. 3A.
FIG. 3C is a front view of the dust plug in FIGS. 3A-3B.
FIG. 3D is a rear view of the dust plug in FIG. 3D.

Referring now to FIGS. 3A-3D, another exemplary dust plug 10" is shown according to a second embodiment of the present disclosure. As shown in the example in FIGS. 3B-3D, the dust plug 10" includes a housing 11, an alignment member 14, and a ferrule protector 16. As shown in the rear view of FIG. 3D, the alignment member 14 may be formed of an upper alignment member portion 18 which is integral to a lower alignment member 14. With reference to the FIG. 3B, the housing 11 includes a plug wall 12, a first side wall 50, a second side wall 52, a bottom wall 54, and a top wall 56. The upper alignment member portion 18 may extending away from a first (or front) side 32 of the plug wall 12 wherein the upper alignment member portion 18 is co-planar with the upper surface of the housing 11 or is co-planar with the top wall 56 of the housing 11. The upper alignment member portion 18 may be configured to engage with an upper region 24 of an adapter 22 via a friction fit wherein the upper region 24 of the adapter 22 may have a slot-like configuration as shown in FIG. 3A.

Figure 3E:
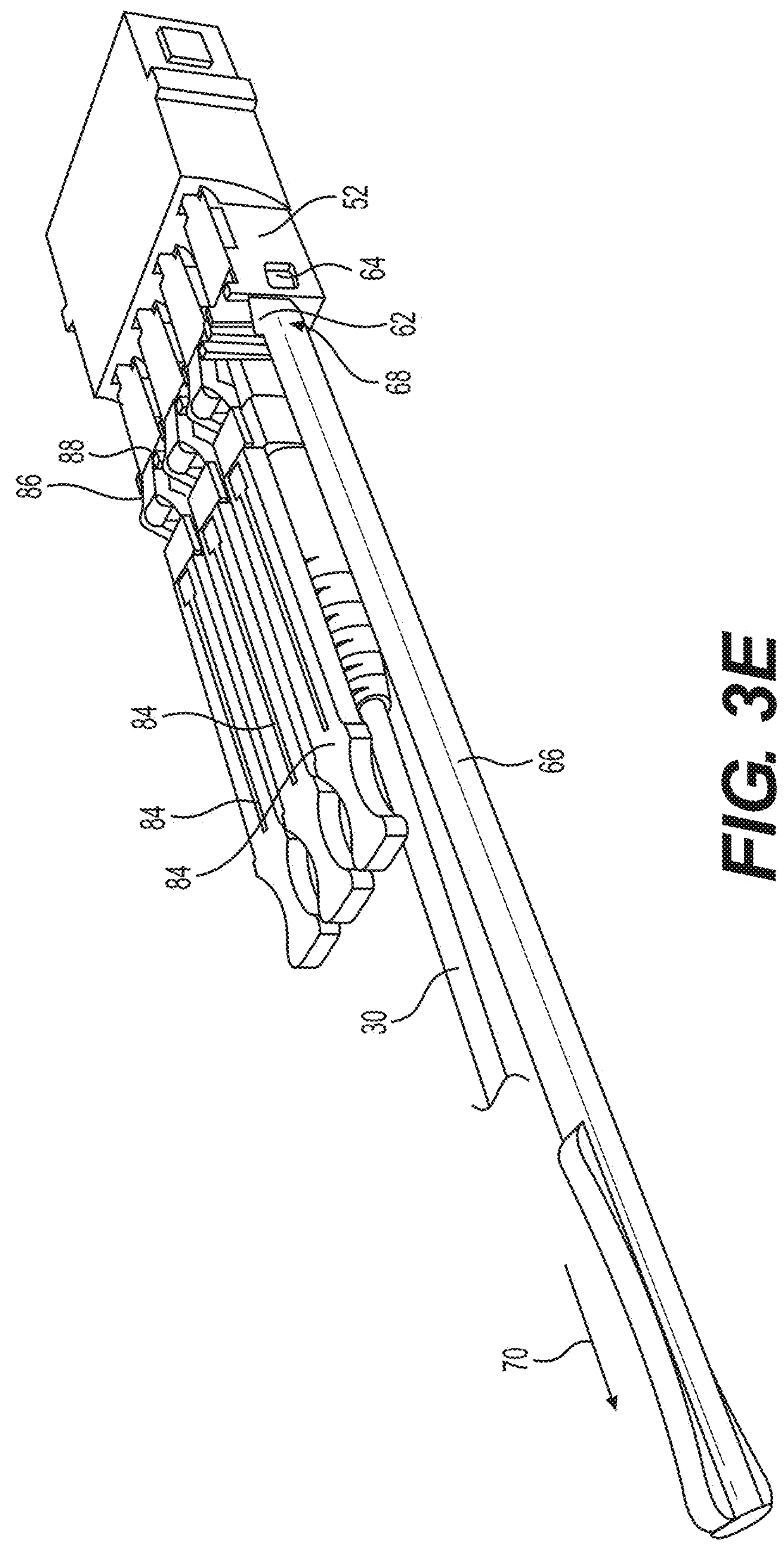
FIG. 3E is a perspective view of a dust plug according to a second embodiment of the present disclosure wherein a removal tool is used to remove the dust plug from the adapter.

As shown in FIG. 3B, the ferrule protector 16 may be disposed proximate to the second (or rear) side 34 of the plug wall 12 into the housing 11 if the ferrule protector 16 is a tubular member 17. However, the ferrule protector 16 may be an integral extension of plug wall 12 wherein the plug wall 12 defines a bore 38. Similar to the first embodiment, the ferrule protector 16 may be configured to receive a ferrule 28 of a fiber optic cable 30 via a friction-fit engagement. The ferrule protector 16, the plug wall 12, and the lower alignment member portion 20 may be integral to each other as shown in FIG. 3B and may be formed from a polymeric material via an injection molding process. Similar to the first embodiment, the dust plug 10" shown in FIGS. 3B-3C may be formed from a translucent polymeric material or an opaque polymeric material. Regardless of the type of material, the dust plug 10" components (including but not limited to the ferrule protector 16, the plug wall 12, the lower alignment member 14, etc) are configured to block a signal 36 from the ferrule 28 of the fiber optic cable 30 when the ferrule 28 is disposed within the ferrule protector 16 and when the alignment member 14 (upper alignment member portion 18 and lower alignment member portion 20) are inserted into the adapter 22. As shown in FIGS. 3A-3B, the housing 11 is configured to prevent debris from contaminating the adapter 22 as well as to prevent debris from contaminating the joint between the ferrule 28 and the ferrule protector 16. Also, as shown in FIG. 3B, the first side wall 50 defines a first aperture 58 and the second side wall 52 defines a second aperture. The first and second apertures may be configured to retain a distal region of a removal tool 66 as shown in FIG. 3E wherein the distal region of the removal tool 66 defines a first protrusion 62 biased in a first lateral direction 48 and a second protrusion 64 biased on a second lateral direction 48. When the removal tool 66 is inserted into the housing 11 as shown in FIG. 3E, the first protrusion 62 engages with the first aperture 58 and the second protrusion 64 of the removal tool 66 engages with the second aperture 60 such that the dust plug 10" may be removed from the adapter 22 by pulling the removal tool 66 in a rearward direction 70.

Referring again to FIG. 3B, the dust plug 10" may further include a first tab 86 extending from an upper region 51 of the first side wall 50 and a second tab 88 extending from an upper region 53 of the second side wall 52 wherein the first and second tabs 86, 88 are configured to retain a fiber optic cable connector 31via a snap-lock fit as shown in FIG. 3A. Also, as shown in FIG. 3B, the upper alignment member portion 18 is a planar member having an upper side 40 and the lower side 42.

Figures 4A, 4B, 4C, 4D:
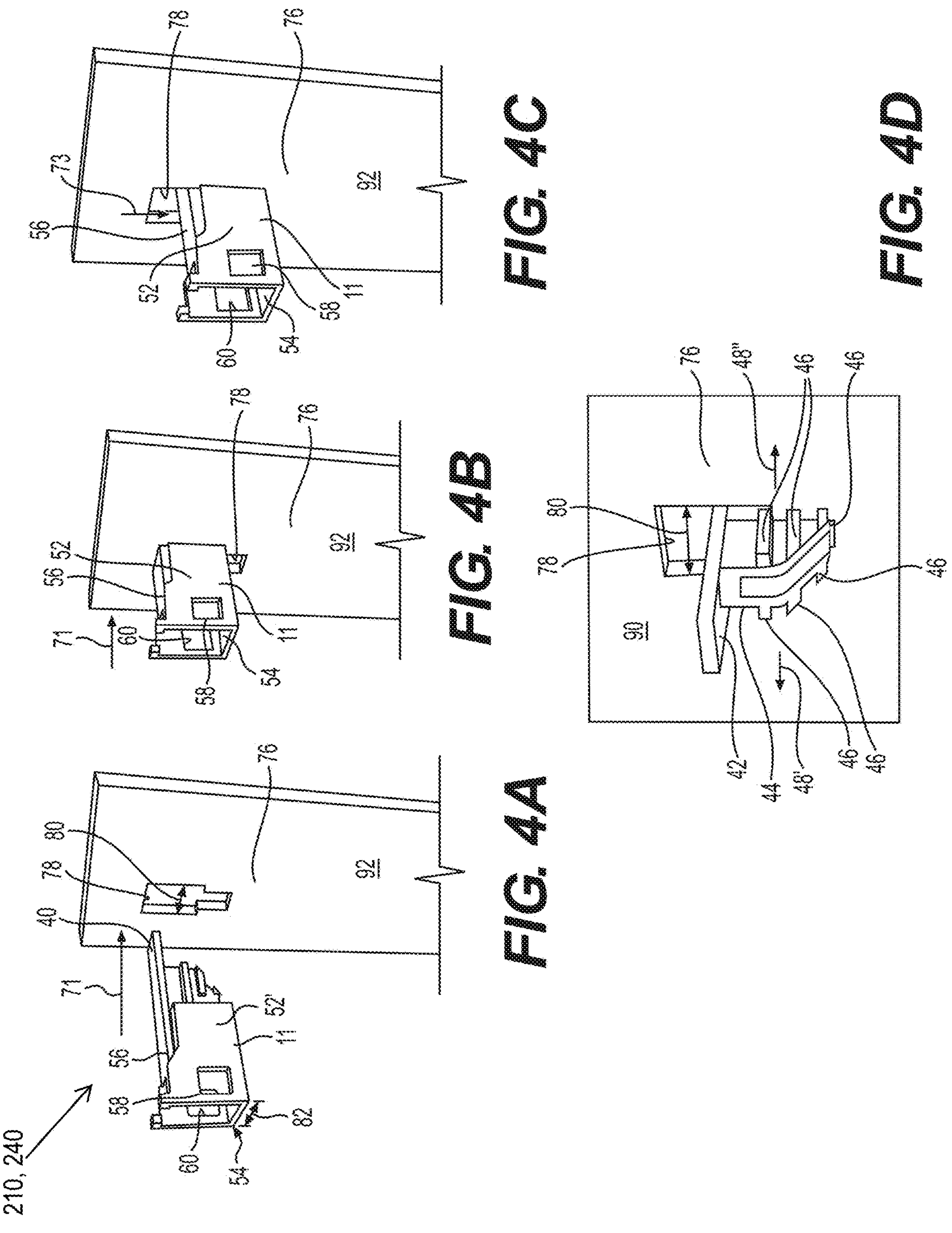
FIG. 4A is a rear isometric view of the dust plug prior to insertion into a wall aperture.
FIG. 4B is a rear isometric view of the dust plug of FIG. 4A inserted into the wall aperture of FIG. 4A.
FIG. 4C is a rear isometric view of the dust plug of FIGS. 4A-4B wherein the dust plug is engaged with the wall aperture.
FIG. 4D is a front isometric view of the dust plug of FIG. 4C.

The lower alignment member 14, the upper alignment member portion 18 and the plug wall 12 may define a vertical slot 96 that is configured to receive a panel 78 as shown in FIGS. 4A-4D. The vertical slot 96 may be useful when an installation site includes openings defined in a panel 78 or panel 78 which are dedicated for storing fiber optic cables 30 which are not intended for connection to an active adapter 22. (see FIGS. 4A-4D). In FIG. 4A, a rear isometric view of the dust plug 10" and panel opening 76 are shown prior to insertion of the dust plug 10". In FIG. 4B, the alignment member 14 (upper alignment member portion 18 and lower alignment member portion 20) of the dust plug 10" of FIG. 4A is inserted into the panel opening 76. In FIG. 4C, the dust plug 10" of FIG. 4B is pushed in a downward direction so that panel 78 is received within the vertical slot 96. The engagement between the vertical slot 96 and the panel 78 may, but not necessarily be a friction fit so as to secure the dust plug 10" and connector 31 in the storage opening 76 of the panel 78. In FIG. 4D, a front isometric view of the dust plug 10" of FIG. 4C is shown wherein the alignment member 14 is shown on the opposite (front) side 90 of the panel 78.

As shown in FIGS. 3C and 4D, the lower alignment member portion 20 may includes a central body 44 which perpendicularly extends from the lower side 42 of the upper alignment member portion 18. The lower alignment member portion 20 may also include a plurality of extensions 46 which extend away from the central body 44 in each lateral direction 48. Therefore, when the dust plug 10" shown in FIGS. 3B-3D is inserted into an adapter 22 (as shown in FIG. 3A), the alignment member 14 (formed by the lower alignment member portion 20 and the upper alignment member portion 18) may have a friction-fit interface with the adapter 22.

Figures 5A, 5B, 5C:
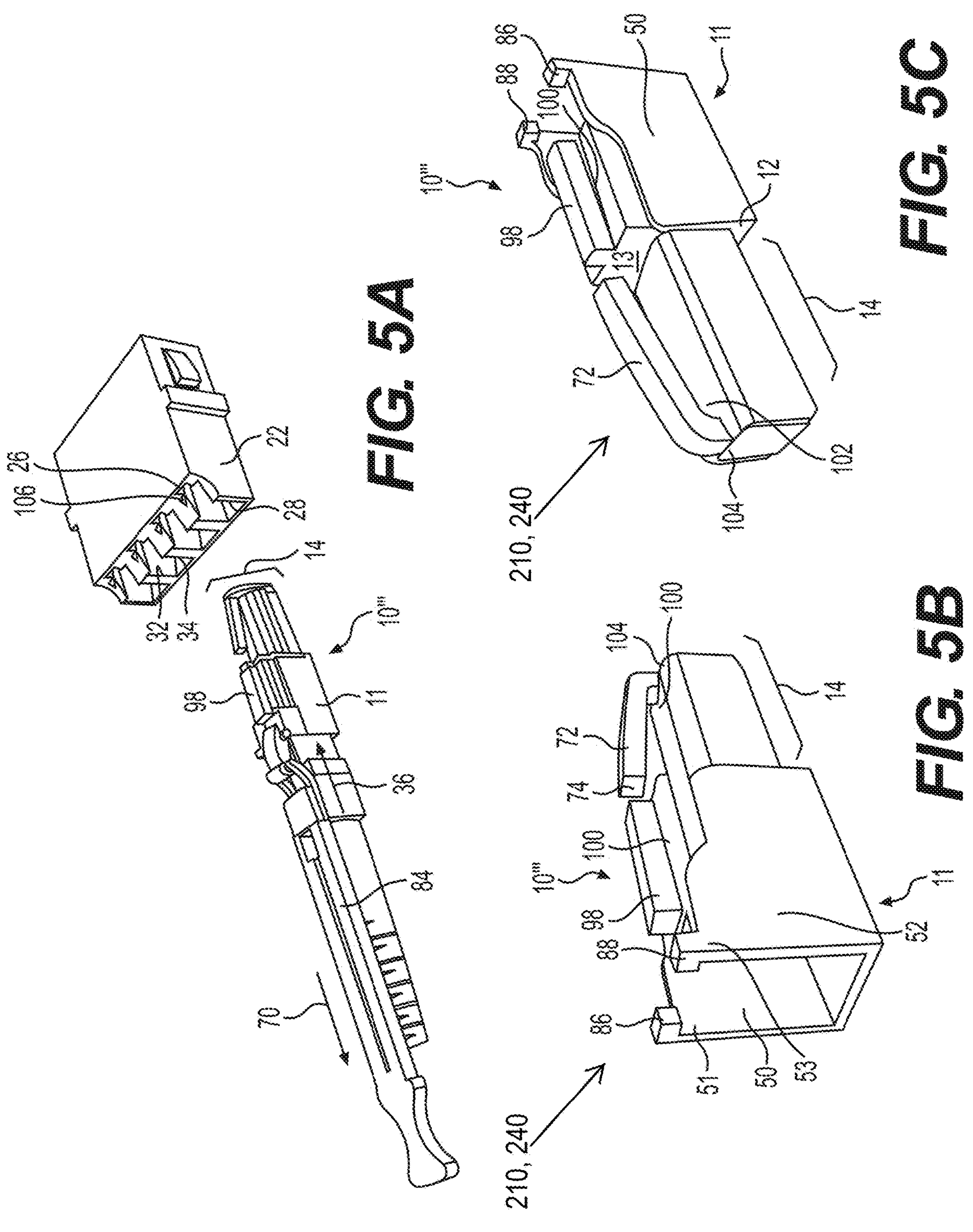
FIG. 5A a perspective view of a dust plug according to a third embodiment of the present disclosure wherein the dust plug(s) is affixed to a connector prior to inserting the dust plug and connector into an adapter.
FIG. 5B is a rear isometric view of the dust plug in FIG. 5A.
FIG. 5C is a front isometric view of the dust plug in FIGS. 5A-5B.
Figure 5D:
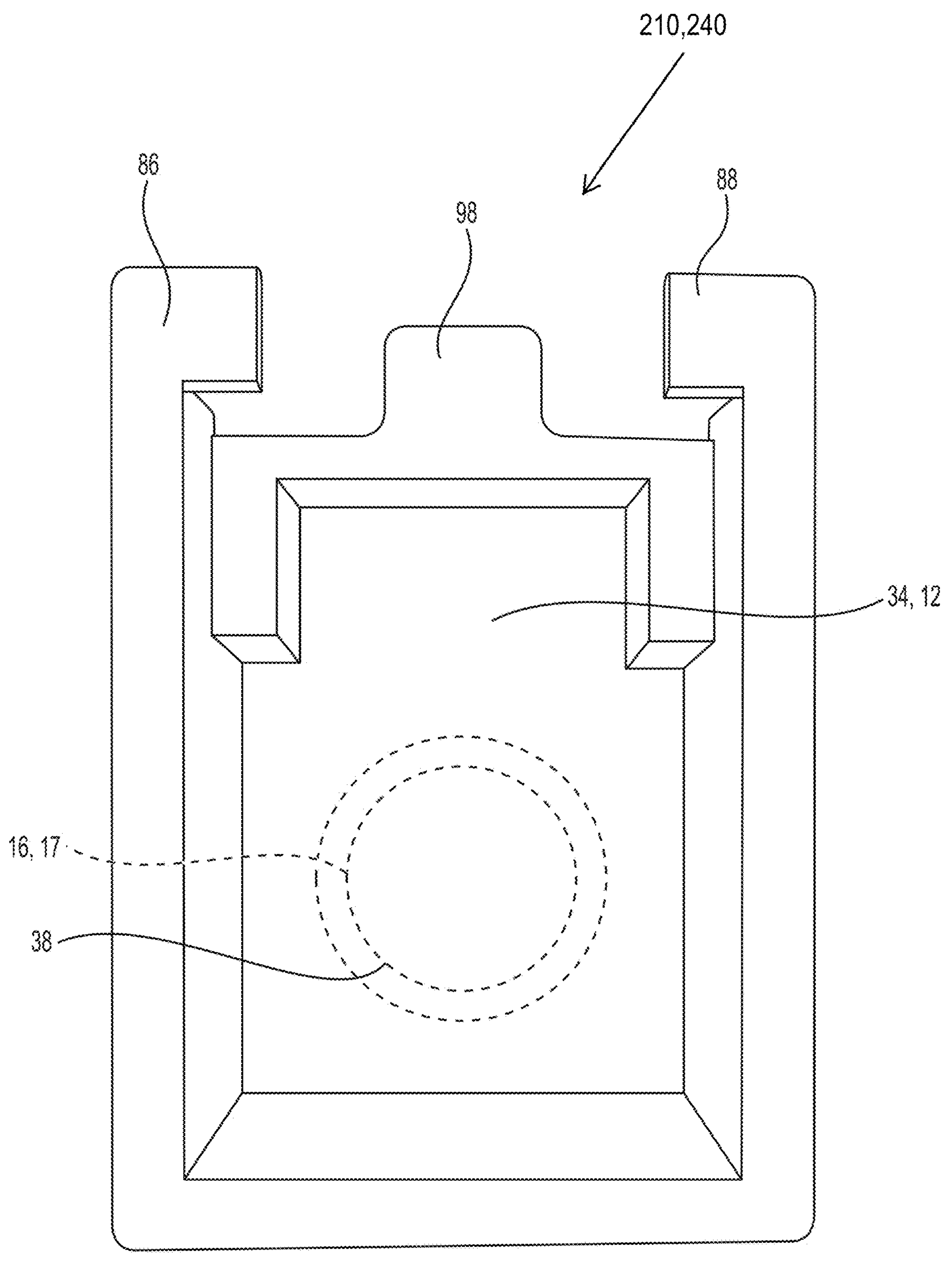

Referring now to FIGS. 5A-5C, another exemplary dust plug 10'" according to a third embodiment of the present disclosure is shown. The dust plug 10'" for the fiber optic connector 31 may include a housing 11, an alignment member 14, and a ferrule protector 16. The housing 11 may include a plug wall 12, a first side wall 50, a second side wall 52, a bottom wall 54, and a top wall 56. The alignment member 14 may extend from a front side/surface 13 of the plug wall 12 wherein the alignment member 14 is configured to be disposed within an adapter 22. The ferrule protector 16 may be a tubular member 17 (as shown in FIGS. 5B-5C) which extends from a rear side 34 of the plug wall 12 into the housing 11 such that the ferrule protector 16 is configured to receive a ferrule 28 of a fiber optic cable 30. However, as indicated earlier, it is also understood that the ferrule protector 16 may be a block-like structure in the form of a thick plug wall 12 wherein a bore 38 is defined in the plug wall 12 (not shown).

As shown in FIGS. 5B-5C, the housing 11, the ferrule protector 16 and the alignment member 14 may be integral to each other and may be formed via an injection molding process. It is also understood that the dust plug 10'" may be formed of a translucent or opaque polymeric material. When a translucent material is used to form the dust plug 10'", a technician/user is able to determine whether a fiber optic cable 30 is active if light is visible through the translucent dust plug 10'". Regardless of the type of material used, the dust plug 10'" (including but not limited to the ferrule protector 16, the plug wall 12, and the lower alignment member portion 20) are configured to block a signal 36 from the ferrule 28 of a fiber optic cable 30 when the ferrule 28 is disposed within the ferrule protector 16 and when the alignment member 14 of the dust plug 10'" is disposed within an active/live adapter 22. The housing 11 of the dust plug 10'" is configured to prevent debris from contaminating the adapter 22 and is also configured to prevent debris from contaminating the ferrule 28 at the joint between the ferrule 28 and the ferrule protector 16. As shown in FIGS. 5B-5C, the dust plug 10'" may further include a flange 98 which extends from an upper surface 100 of the housing 11 wherein the flange 98 is configured to prevent the dust plug 10'" from rocking/pivoting when the dust plug 10'" is inserted into a wall as described below and shown in FIGS. 5B-5C.

Also, as shown in FIGS. 5B-5C, the alignment member 14 includes a main body 94 and a biasing portion 72 extending from an upper face 102 of the main body 94 (proximate to the distal end 104 of main body 94). The main body 94 and the biasing portion 72 may be configured to be friction fitted within the adapter 22. In particular, the biasing portion 72 may be friction fitted against the upper interior side of the adapter 22 while the alignment body may be friction fitted within the lower region 26 of the adapter 22. Moreover, the dust plug 10''' shown in FIGS. 5A-5C may include a first tab 86 extending from an upper region 51 of the first side wall 50 and a second tab 88 extending from an upper region 53 of the second side wall 52 wherein the first and second tabs 86, 88 are configured to retain a fiber optic cable connector 31 via a snap-lock fit as shown in FIG. 5A.

Figure 6A:
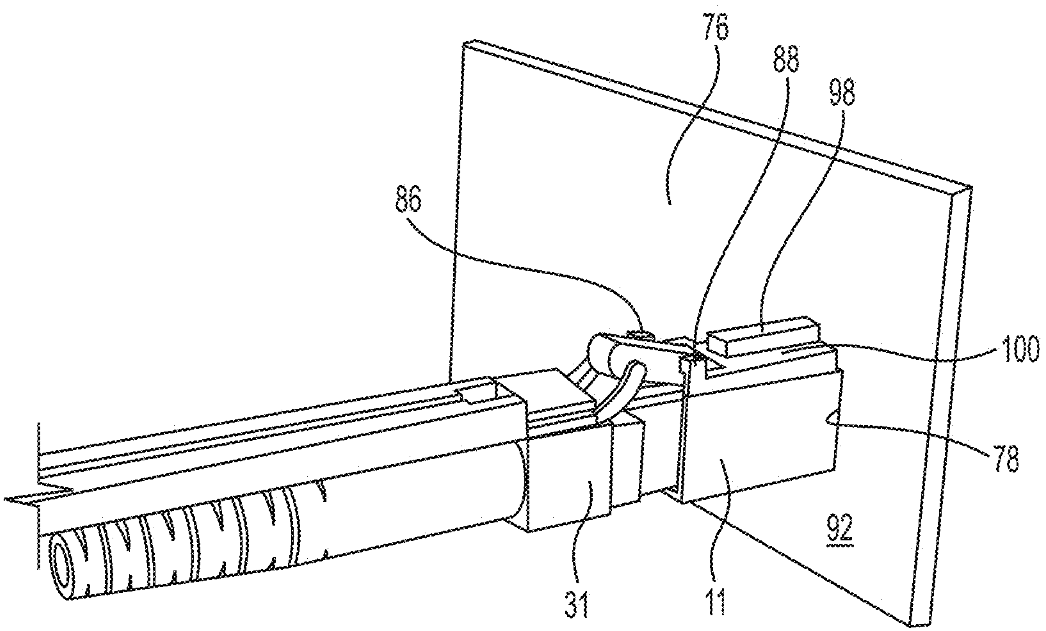
FIG. 6A is a rear isometric view of the dust plug of FIGS. 5A-5B wherein the dust plug is engaged with the wall aperture.
Figure 6B:
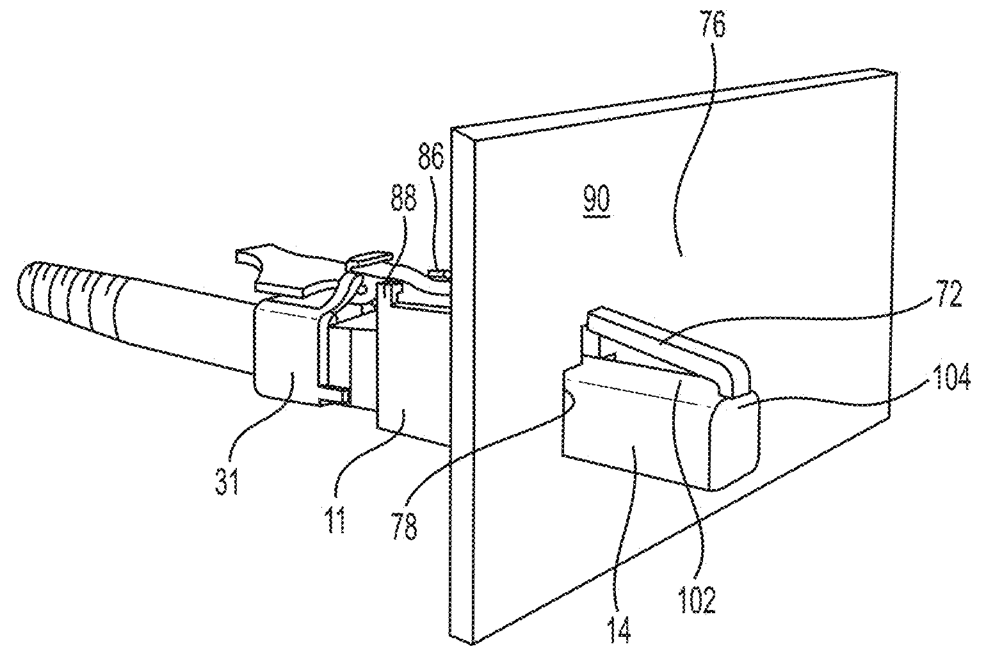
FIG. 6B is a front isometric view of the dust plug of FIG. 6A.

Referring now to FIGS. 6A-6B, it is understood that the dust plug 10''' of the present disclosure may also be implemented at sites where storage openings 76 are provided in a panel 78 or panel 78 to store the fiber optic cables 30 and their connectors 31. In this circumstance, the dust plug 10''' prevents debris from contaminating the ferrule 28. FIG. 6A is a rear isometric view of the dust plug 10''' of FIGS. 5A-5B wherein the dust plug 10''' is engaged with the panel opening 76 used to store a fiber optic cable 30 and its connector 31. As FIG. 6B is a front isometric view of the dust plug 10''' and panel opening 76 of FIG. 6A. In FIGS. 6A-6B, the main body 94 and the biasing portion 72 of the alignment member 14 are inserted through the panel opening 76 so that the distal end face 74 of the biasing portion 72 abuts the front side 90 of the panel 78 thereby preventing the dust plug 10''' from falling out of the panel opening 76. As shown in FIGS. 5B-5C, the housing width 82 is greater than the panel opening width 80. Accordingly, the dust plug 10''' is fixed in the panel opening 76 via the housing 11 (abutting rear side 92 of the panel 78 at the front face of the housing 11—see FIG. 5C and 6A) and the biasing portion 72 (distal end face 74 of the biasing portion 72 abutting the front side 90 of the panel 78). In order to remove the fiber optic connector 31 31 from the storage position of FIGS. 6A-6B, the lever 84 of the connector 31 must be pulled in a rearward direction 70 to disengage connector 31 from the first and second tabs 86, 88 of the dust plug 10''' (see FIGS. 6A-6B).

Figure 7:
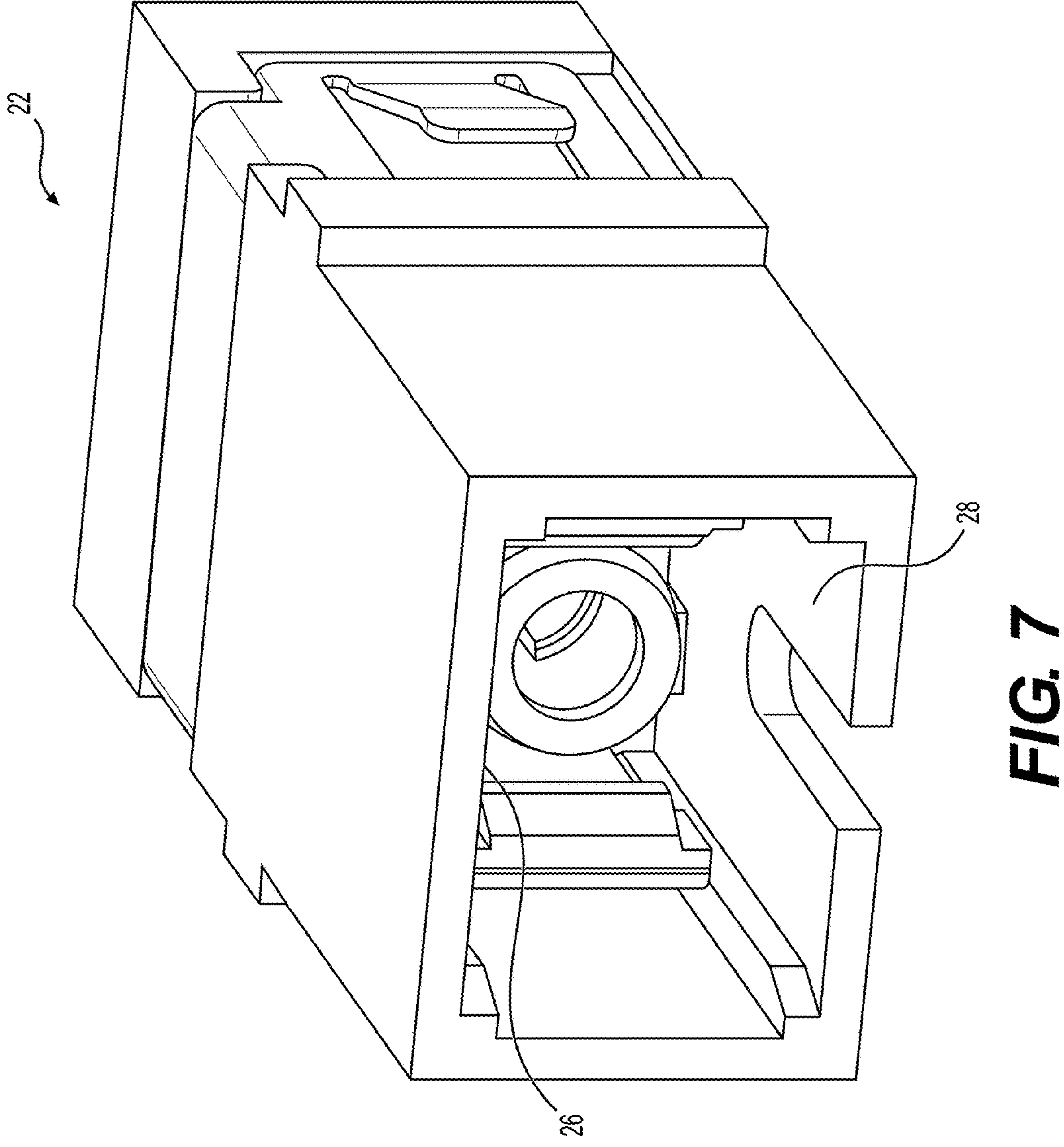
FIG. 7 is a rear isometric view of another embodiment of a dust plug wherein the connector is an SC connector.
Figure 8:
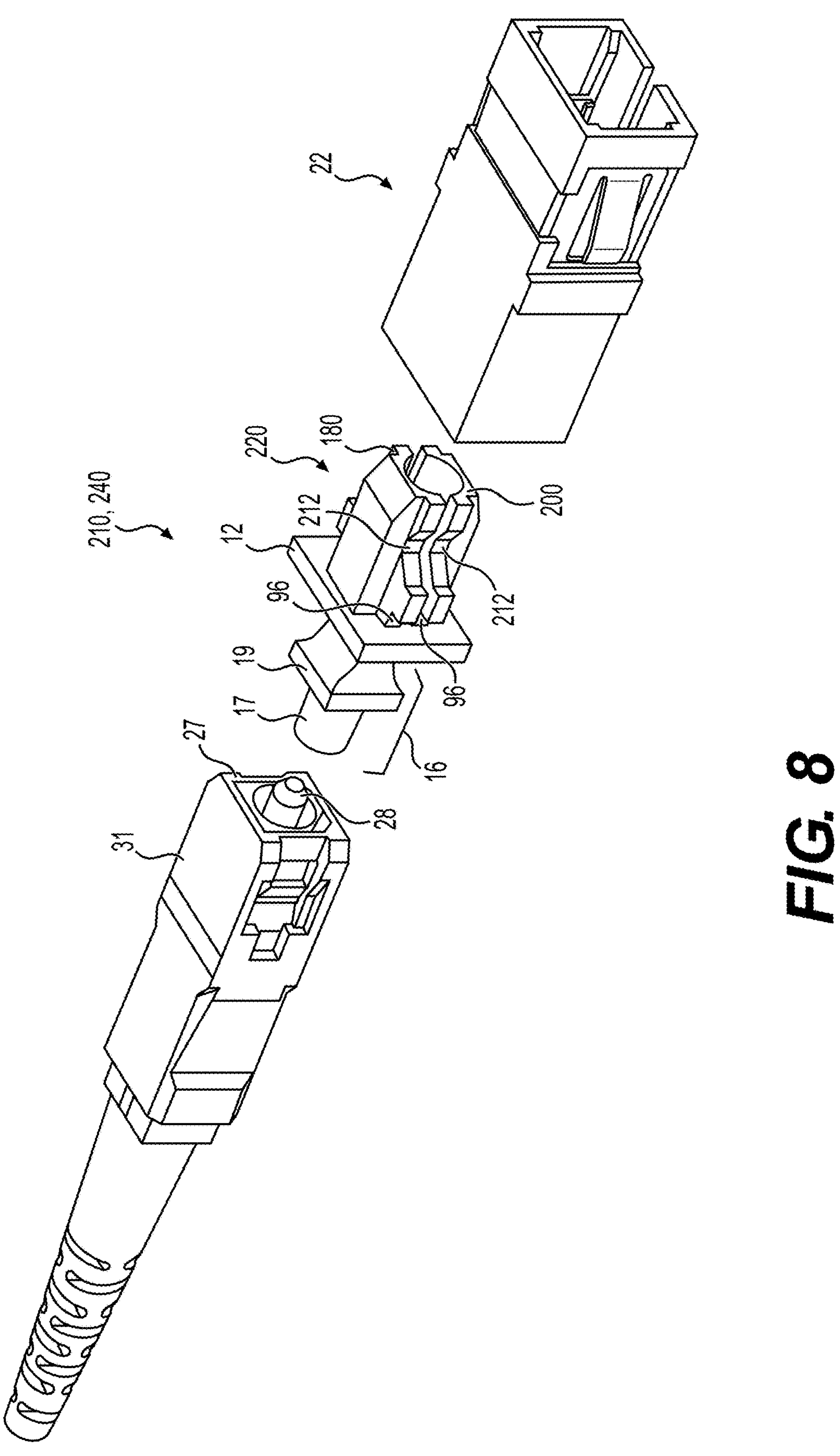
FIG. 8 is an expanded view of the dust plug of FIG. 7, an SC connector and an adapter.
Figure 9A:
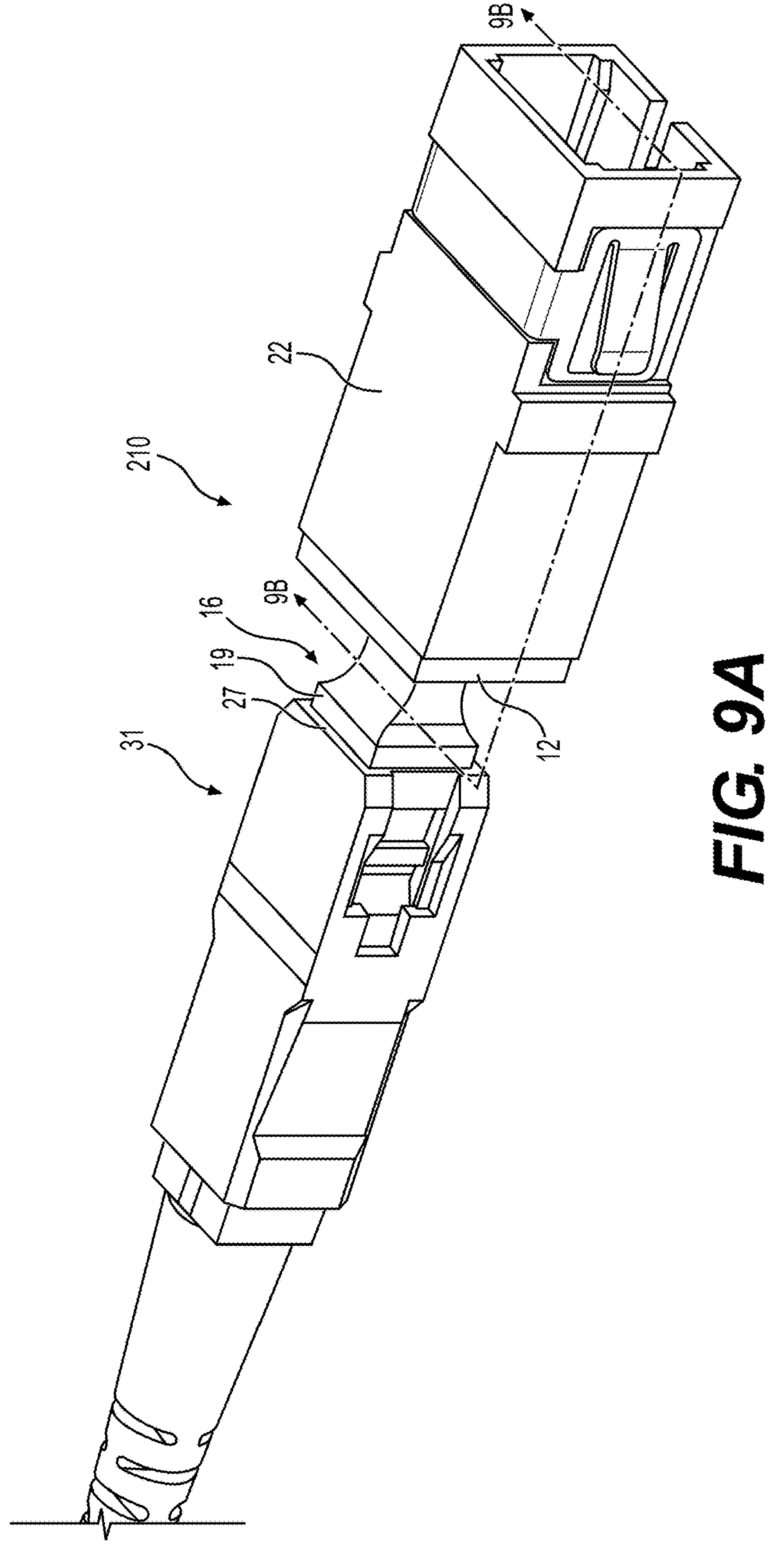
FIG. 9A is an isometric view of the dust plug of FIG. 7, an SC connector and an adapter.
Figure 9B:
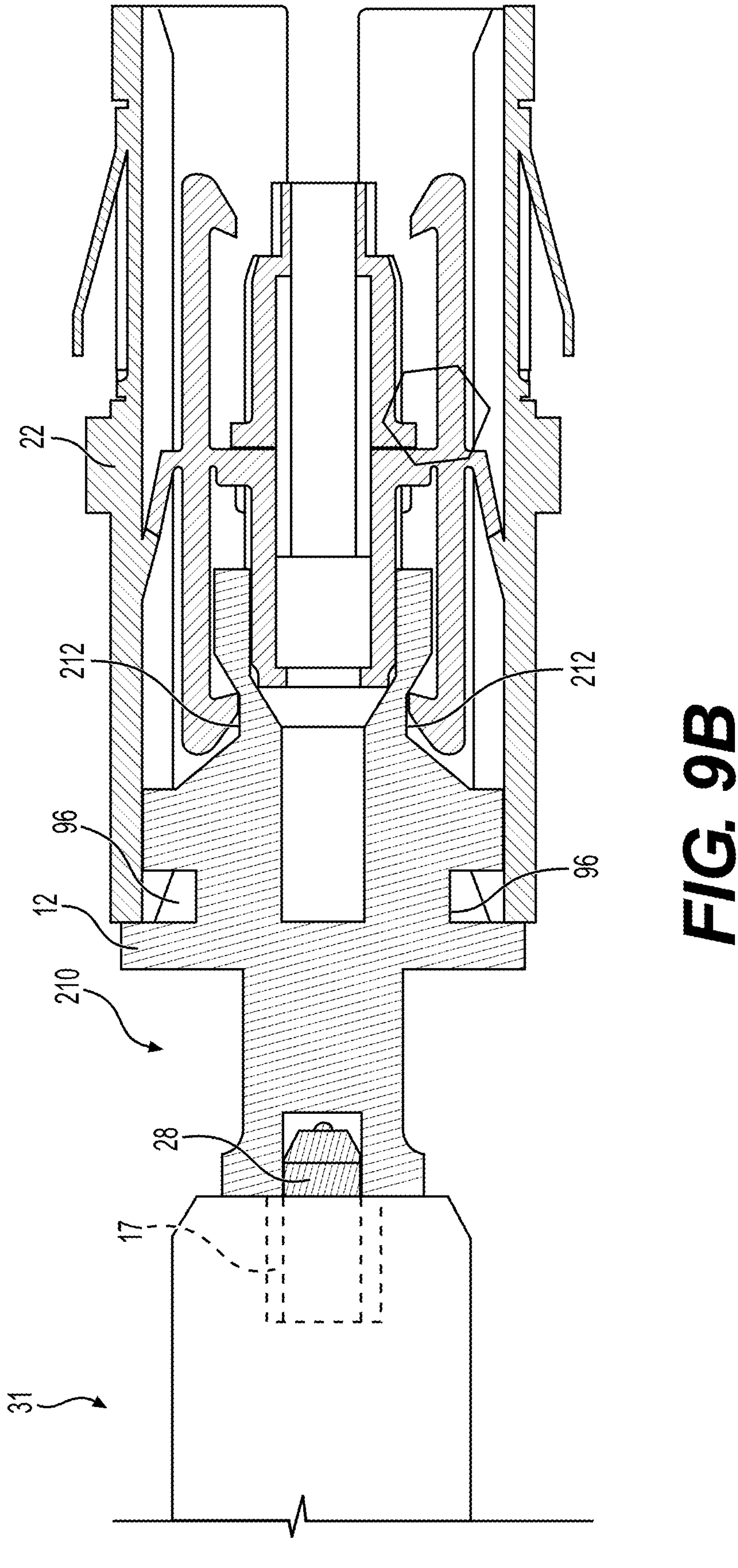
FIG. 9B is a cross section of the assembly in FIG. 9A along line 9B-9B.
Figures 10A, 10B:
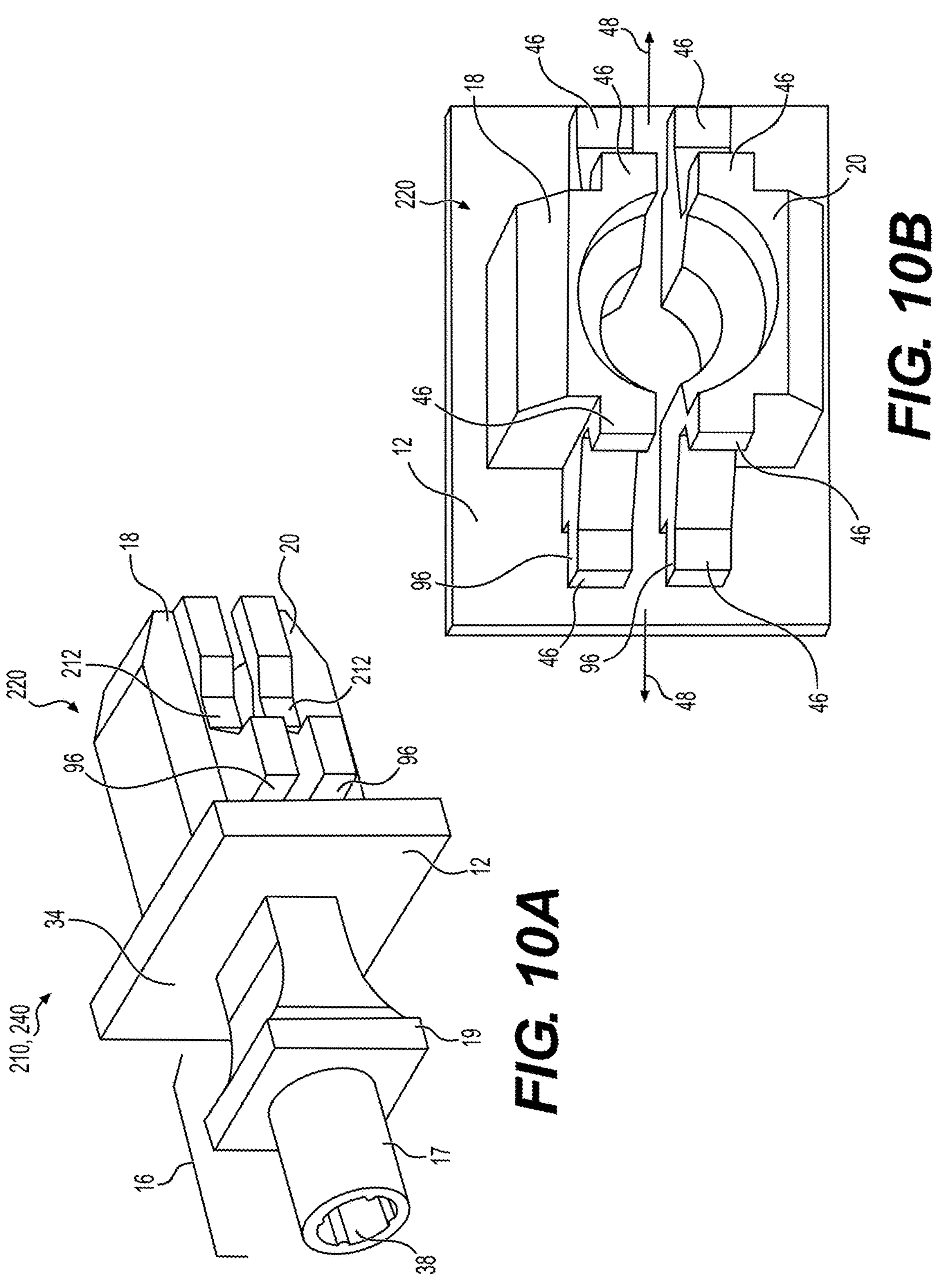
FIG. 10 is a front isometric view of another embodiment of a dust plug wherein the connector is an SC connector.

Referring now to FIGS. 10A and 10 ft a dust plug 210 according to yet another embodiment of the present disclosure is shown. The dust plug 210 for a fiber optic connector 31 may include a plug wall 12, an alignment portion 220, and a ferrule protector 16 that may extending from the first side of the plug wall and configured to be disposed within an adapter. The alignment portion 220 may include an upper alignment member 14, a lower alignment member portion 20. The ferrule protector 16 may include a tubular structure 17 as shown in FIG. 10A and abutment flange 19. The ferrule protector 16 defines a bore 38 that is configured to receive a ferrule 28 of a fiber optic cable 30. As shown in FIG. 8, the ferrule protector 16 may include an abutment flange 19 on an outer surface 21 of the ferrule protector 16. The abutment flange 19 may be configured to abut a portion of the connector 31. The ferrule protector 16 may extend from a second side 32 of the plug wall 12. The plug wall 12 may be a panel (as shown in FIG. 10A) wherein the plug wall 12 has a first (or front) side 32 and a second (or rear) side 33. The upper alignment member portion 18 may extend from the first side 32 of the plug wall 12 wherein the upper alignment member 18 is configured to engage with an upper region 26 of an adapter 22 (see FIG. 7). The lower alignment member portion 20 is configured to engage with a lower region 28 (see FIG. 7) of the adapter 22. The upper and lower alignment member portions 18, 20 may be integral to the plug wall 12 as shown in the dust plug 210 of FIGS. 8-14 such that the aforementioned components form a monolithic piece 240 of unitary construction. The upper and lower alignment member portions 18, 20 are configured to be disposed within the adapter 22 via a friction fit or interference fit as shown in FIG.8 and FIGS. 9A-9B. Also, as shown in FIG. 9B, it is also understood that the symmetrical notched regions 212 defined by the upper and/or lower alignment members 18, 20 of the dust plug 210 may be configured to have a snap-fit engagement with the flexible latches 214 inside the adapter 22. (See FIG. 9B). In order to remove the dust plug 210 from the adapter 22, the dust plug 210 may be manually retracted out of the adapter 22.

Referring again to FIG. 10A, the ferrule protector 16 is shown including a tubular structure 17 wherein the ferrule protector 16 extends from the plug wall 12. The outer surface 21 of the ferrule protector 16 may include an abutment flange 19. The abutment flange 19 may be configured to abut a portion of the connector 31. It is understood that the ferrule protector 16 may also be a block-like structure (not shown) which defines a bore 38 wherein the front surface of the block like structure forms the plug wall 12. The bore 38 defined in the ferrule protector 16 is configured to receive the ferrule 28 of the fiber optic cable 30 which may, but not necessarily be a friction fit between the ferrule 28 and the ferrule protector 16. The bore 38 defined in the ferrule protector 16 is configured to receive the ferrule 28 of the fiber optic cable 30 which.

As shown in FIGS. 10A-10 ft the plug wall 12, the ferrule protector 16, the upper alignment member portion 18 and the lower alignment member portion 20 may be form a monolithic piece 240 of unitary construction. It is understood that the plug wall 12, the ferrule protector 16, the upper alignment member portion 18 and the lower alignment member portion 20 may be formed from a polymeric (non-conductive material) which is either opaque or translucent. Accordingly, the dust plug 210 may be formed via an injection molding process. In the event the dust plug 210 components are formed a translucent polymeric material and the dust plug 210 is disposed on a connector 31 for a fiber optic cable 30, a user/technician would be able to detect if the fiber optic cable 30 is live/active due to light which may be transmitted through the translucent material. Regardless of whether the dust plug 210 is formed from an opaque or translucent material, the plug wall 12 and the lower alignment member portion 20 and the ferrule protector 16 are configured to block a signal 36 from the ferrule 28 of the fiber optic cable 30 when the ferrule 28 is disposed within the ferrule protector 16 and when the single alignment member 14 (upper and lower alignment member portions 18, 20 integral to each other) is inserted into the adapter 22 (see FIG. 2B).

As shown in FIG. 10B, the upper and lower alignment member portions 18, 20 extend from the plug wall. Each of the upper and lower alignment member portions 18, 20 may further include a plurality of extensions 46 (FIG. 10B) which extend away in each lateral direction 48 as shown in FIG. 10B. The extensions 46 may be configured to abut the inner side walls of the adapter 22 as shown in FIG. 9B.

Figure 12:
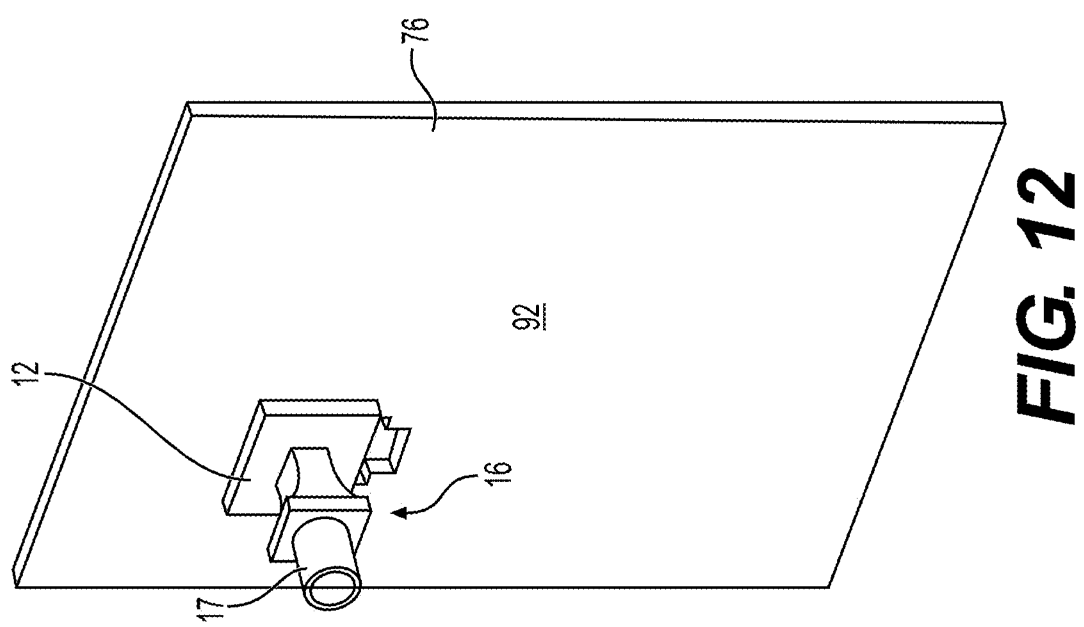
FIG. 12 is the dust plug of FIG. 7 initially inserted in the panel's opening.
Figure 11:
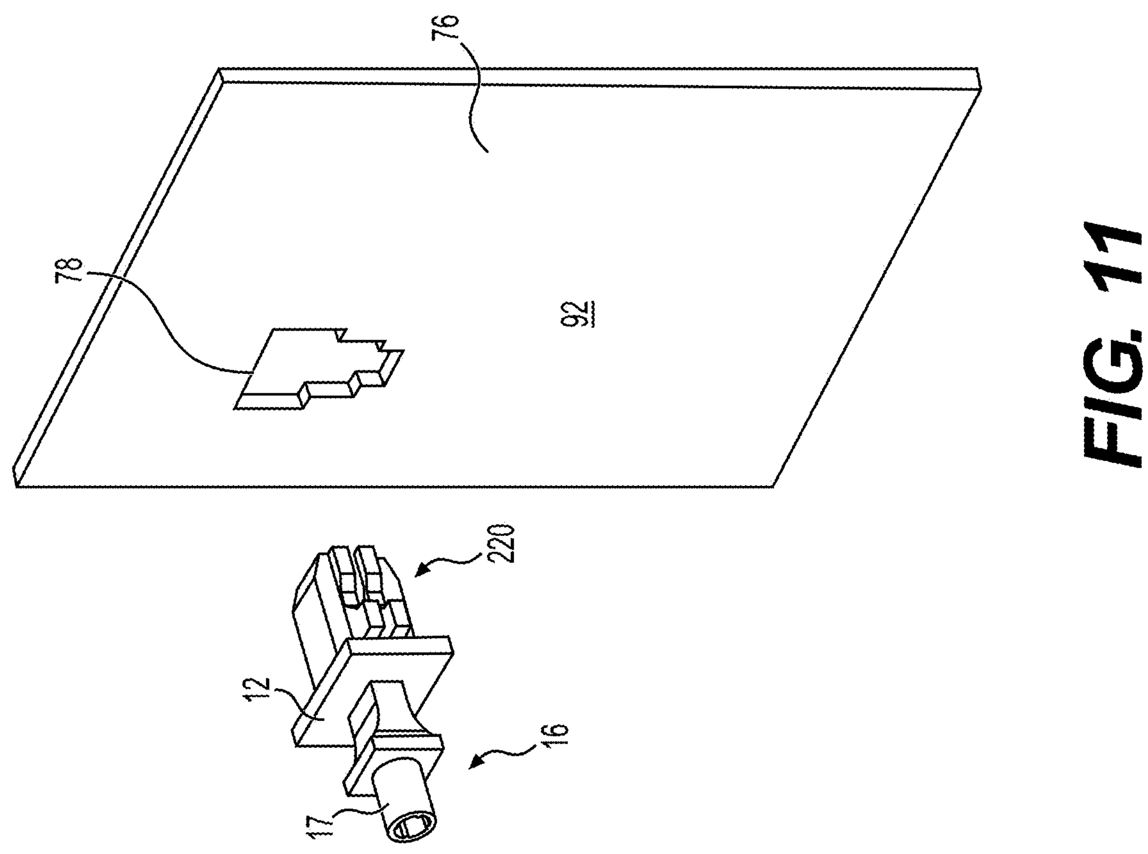
FIG. 11 is the dust plug of FIG. 7 before it is installed in a panel's opening.
Figure 13:
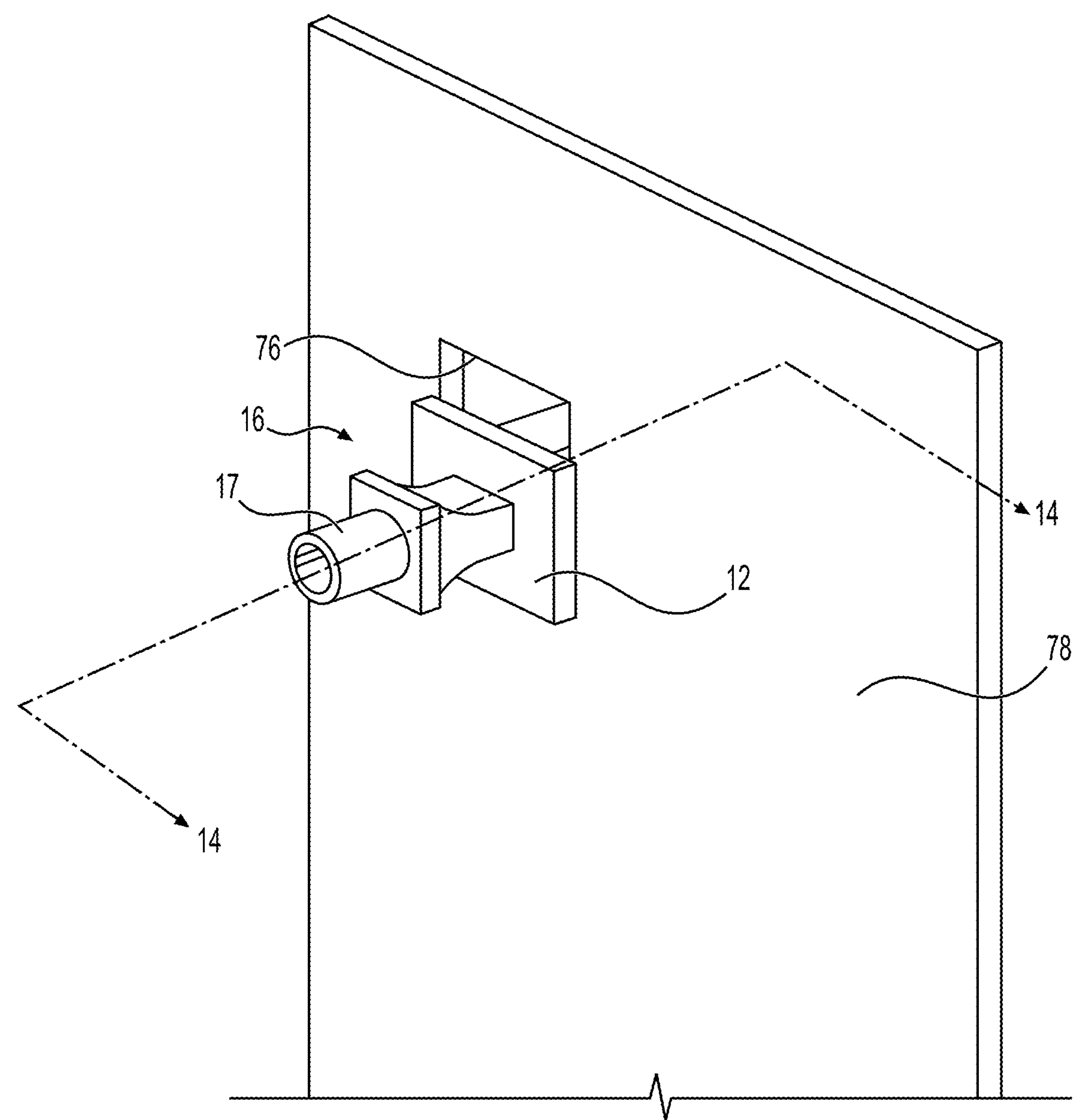
FIG. 13 is the dust plug of FIG. 7 lowered and secured in the panel's opening.
Figure 14:
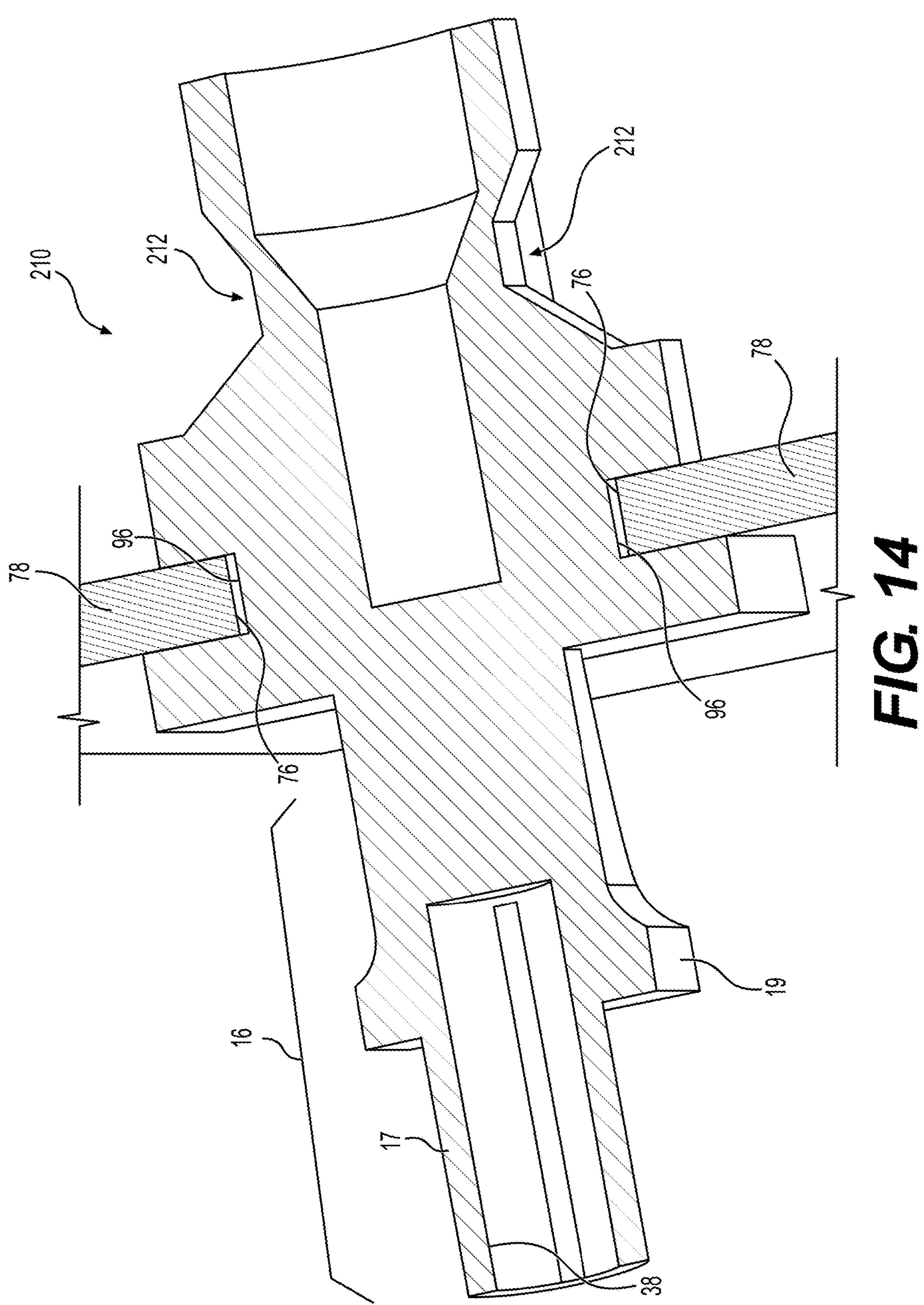
FIG. 14 is the cross-sectional view of the dust plug and wall panel along line 14-14 in FIG. 13.

Referring to FIGS. 10A, 10B and 14, the lower alignment member 18, the plug wall 12 and/or the upper alignment member portion 18 may define slots 96 that is configured to receive a panel 78 as shown in FIGS. 11-13. The slots 96 may be useful when an installation site includes openings defined in a panel 78 or panel 78 that are dedicated for storing fiber optic cables 30 which are not intended for connection to an active adapter 22. (see FIGS. 11-14). In FIG. 11, a rear isometric view of the dust plug 210 and panel opening 76 are shown prior to insertion of the dust plug 210. In FIG. 12, the alignment member 14 (upper alignment member portion 18 and lower alignment member portion 20)

of the dust plug 210 is inserted into the panel opening 76. In FIG. 13 and FIG. 14, the dust plug 210 is pushed in a downward direction so that panel 78 is received within the vertical slot 96 as shown in FIG. 14. The engagement between the vertical slot 96 and the panel 78 may, but not necessarily, be a friction fit so as to secure the dust plug 210 (and connector not shown in FIG. 14) in the storage opening 76 of the panel 78.

With respect to the various embodiments of the present disclosure, it is understood that contaminants should be construed to mean dust, fingerprints, debris, or other items that might degrade optical signal transmission if such dust, fingerprints or other items are deposited on the ferrule. Also, with respect to the various embodiments of the present disclosure, it is understood that the alignment member 14 shown in various figures of the present disclosure may also be construed to be a portion 14 of the housing 11 that is inserted into either a panel opening 76 or an adapter 22.

While multiple non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A dust plug for a fiber optic connector configured to prevent contaminants from being deposited on a ferrule and also configured to be inserted into an adapter and/or a panel opening comprising:
  - a housing having a plug wall, a first side wall, a second side wall, a bottom wall, and a top wall;
  - an upper alignment portion configured to extend away from a first side of the plug wall and be co-planar with the top wall;
  - a lower alignment portion configured to extend from a lower side of the upper alignment portion;
  - a ferrule protector extending from a second side of the plug wall into the housing;
  - wherein the ferrule protector is configured to receive a ferrule of a fiber optic cable;
  - wherein the upper alignment portion is configured to engage an upper region of an adapter;
  - wherein the ferrule protector, the plug wall, and the lower alignment portion are configured to block a signal from the ferrule when the ferrule is disposed within the ferrule protector;
  - wherein the first side wall is configured to define a first aperture and the second side wall is configured to define a second aperture, and wherein the first and second apertures are configured to retain a distal region of a removal tool;
  - wherein the housing and the ferrule protector are configured to cover the ferrule such that the dust plug is configured to prevent contaminants from being deposited on the ferrule when the ferrule is disposed in the ferrule protector;
  - wherein the housing is configured to be disposed in an adapter for the connector such that the dust plug is configured to couple the connector with the adapter;
  - wherein the housing is configured to be disposed in a panel opening such that dust plug is configured to couple the connector with the panel opening:
  - wherein the upper alignment portion, the lower alignment portion, and the plug wall are configured to define a slot, and the slot is configured to receive a portion of a panel therein; and
  - wherein at least one of the upper alignment portion and the lower alignment portion is structurally configured to selectively couple the dust plug with the fiber optic adapter or the panel opening such that the dust plug is configured to permit a fiber optic connector to be coupled with and decoupled from the dust plug while the at least one of the upper alignment portion and the lower alignment portion is selectively coupled with one of the fiber optic adapter and the panel opening.

2. The dust plug of claim 1, further comprising a first tab extending from the first side wall and a second tab extending from the second side wall; and
  - wherein the first and second tabs are configured to retain a fiber optic cable connector via a snap-lock fit.

3. The dust plug of claim 1, wherein the upper alignment portion comprises a planar portion having an upper side and the lower side.

4. The dust plug of claim 1, wherein the alignment portion is structured and arranged to be inserted through a panel opening from a first side of the panel and the upper alignment portion and the lower alignment portion are structured and arranged to abut an opposite second side of the panel so as to prevent the dust plug from falling out of the panel opening.

5. The dust plug of claim 1, wherein the lower alignment portion includes a central body configured to extend perpendicularly from the lower side of the upper alignment portion and a plurality of extensions configured to extend away from the central body in each lateral direction.

6. The dust plug of claim 1, wherein the housing, the upper alignment portion, the lower alignment portion, and the ferrule protector comprise a monolithic piece of unitary construction.

7. A dust plug for a fiber optic connector configured to prevent contaminants from being deposited on a ferrule and configured to be inserted into an adapter and/or a panel opening comprising:
  - a housing having a plug wall, a first side wall, a second side wall, a bottom wall, and a top wall;
  - an alignment portion extending from a front surface of the plug wall and being configured to be disposed within one of an adapter for the connector or a panel opening;
  - a ferrule protector extending from a rear side of the plug wall into the housing, the ferrule protector being configured to receive a ferrule of a fiber optic cable;
  - wherein the ferrule protector, the plug wall, and a lower alignment portion are configured to block a signal from the ferrule when the ferrule is disposed within the ferrule protector;
  - wherein the alignment portion includes a main body and a biasing portion extending from an upper face of the main body;
  - wherein the housing is configured to be disposed in an adapter for the connector such that the dust plug is configured to couple the connector with the adapter;
  - wherein the housing is configured to be disposed in a panel opening such that dust plug is configured to couple the connector with the panel opening; and
  - wherein the alignment portion is structurally configured to selectively couple the dust plug with the fiber optic adapter or the panel opening such that the dust plug is configured to permit a fiber optic connector to be coupled with and decoupled from the dust plug while the alignment portion is selectively coupled with one of the fiber optic adapter and the panel opening.

8. The dust plug of claim 7, further comprising a first tab extending from the first side wall and a second tab extending from the second side wall wherein the first and second tabs are configured to retain a fiber optic cable connector via a snap-lock fit.

9. The dust plug of claim 7, further comprising a flange extending from an upper surface of the housing, the flange being configured to prevent the dust plug from rocking/pivoting when the dust plug is inserted into a wall.

10. The dust plug of claim 7, wherein the housing, the ferrule protector and the alignment portion are integral to each other.

11. The dust plug of claim 7, wherein the main body and the biasing portion are configured to be friction fitted within the adapter.

12. The dust plug of claim 7, wherein the biasing portion is structured and arranged to be biased aw y from an upper face of the main body, and the biasing portion is structured and arranged to be urged toward the main body such that the alignment portion is structured and arranged to be inserted through a panel opening from a first side of the panel and the biasing portion is structured and arranged to abut an opposite second side of the panel to prevent the dust plug from falling out of the panel opening.

13. The dust plug of claim 7, wherein the ferrule protector includes a tubular portion that is configured to receive a ferrule of a fiber optic cable.

14. A dust plug for a fiber optic connector configured to prevent contaminants from being deposited on a ferrule and configured to be inserted into an adapter and/or a panel opening comprising:

a plug wall having a first side and a second side;

an alignment portion extending from the first side of the plug wall;

a ferrule protector extending from the second side of the plug wall;

wherein the ferrule protector is configured to receive a ferrule of a fiber optic connector;

wherein the ferrule protector and the plug wall are configured to cover the ferrule such that the dust plug is configured to prevent contaminants from being deposited on the ferrule and to block a signal from the ferrule when the ferrule is disposed within the ferrule protector;

wherein the alignment portion is configured to be received by a fiber optic adapter such that the dust plug is configured to retain the fiber optic connector in the fiber optic adapter;

wherein the alignment portion is configured to be received in a panel opening such that the dust plug is configured to retain the fiber optic connector in the panel opening;

wherein the alignment portion includes an upper alignment portion extending from the first side of the plug wall and configured to engage with an upper region of an adapter and a lower alignment portion extending from the first side of the plug wall and configured to engage with a lower region of the adapter:

wherein the upper alignment portion, the lower alignment portion, and the plug wall are structured to define a slot, and the slot is structured and arranged to receive a portion of a panel therein such that the alignment portion is structured and arranged to be inserted through a panel opening from a first side of the panel and the upper alignment portion and the lower alignment portion are structured and arranged to abut an opposite second side of the panel so as to prevent the dust plug from falling out of the panel opening; and wherein the alignment portion is structurally configured to selectively couple the dust plug with the fiber optic adapter or the panel opening such that the dust plug is configured to permit a fiber optic connector to be coupled with and decoupled from the dust plug while the alignment portion is selectively coupled with one of the fiber optic adapter and the panel opening.

15. The dust plug of claim 14, wherein the lower alignment portion extends from a lower side of the upper alignment portion.

16. The dust plug of claim 15, wherein the upper alignment portion and the lower alignment portion are configured to be friction fitted within the adapter.

17. The dust plug of claim 16, wherein the lower alignment portion includes a central body that perpendicularly extends from the lower side of the upper alignment portion and a plurality of extensions that extend away from the central body in a lateral direction.

18. The dust plug of claim 14, wherein the plug wall, the ferrule protector, the upper alignment portion, and the lower alignment portion are integral to each other.

19. The dust plug of claim 14, wherein the ferrule protector defines an abutment flange on an exterior surface of the ferrule protector.

20. A dust plug for a fiber optic connector configured to prevent contaminants from being deposited on a ferrule and configured to be inserted into an adapter and/or a panel opening comprising:

a plug wall having a first side and a second side;

an alignment portion extending from the first side of the plug wall;

a ferrule protector extending from the second side of the plug wall;

wherein the ferrule protector is configured to receive a ferrule of a fiber optic connector;

wherein the ferrule protector and the plug wall are configured to cover the ferrule such that the dust plug is configured to prevent contaminants from being deposited on the ferrule and to block a signal from the ferrule when the ferrule is disposed within the ferrule protector;

wherein the alignment portion is configured to be received by a fiber optic adapter such that the dust plug is configured to retain the fiber optic connector in the fiber optic adapter so as to prevent contaminants from being deposited on the ferrule of the fiber optic connector while the fiber optic connector is retained in the adapter;

wherein the alignment portion is configured to be received in a panel opening such that the dust plug is configured to retain the fiber optic connector in the panel opening so as to prevent contaminants from being deposited on the ferrule of the fiber optic connector while the fiber optic connector is retained in the panel opening;

wherein the alignment portion includes a main body portion and a biasing portion extending from and biased away from an upper face of the main body portion, and the biasing portion is structured and arranged to be urged toward the main body portion such that the alignment portion is structured and arranged to be inserted through a panel opening from a first side of the panel and the biasing portion is structured and arranged to abat an opposite second side of the panel to prevent the dust plus from falling out of the panel opening; and wherein the alignment portion is structurally configured to selectively couple the dust plug with the fiber optic adapter or the panel opening such that the dust plug is configured to permit a fiber optic connector to be coupled with and decoupled from the dust plug while the alignment portion is selectively coupled with one of the fiber optic adapter and the panel opening.

21. The dust plug of claim 20, wherein the alignment portion includes an upper alignment portion extending from the first side of the plug wall and configured to engage with an upper region of an adapter and a lower alignment portion extending from the first side of the plug wall and configured to engage with a lower region of the adapter.

22. The dust plug of claim 21, wherein the upper alignment portion and the lower alignment portion are configured to be friction fitted within the adapter.

23. The dust plug of claim 21, wherein the plug wall, the ferrule protector, the upper alignment portion, and the lower alignment portion are integral with each other.

24. The dust plug of claim 21, wherein the ferrule protector defines an abutment flange on an exterior surface of the ferrule protector.

25. The dust plug of claim 20, wherein the alignment portion is configured to be received by the fiber optic adapter with the dust plug coupled with a fiber optic connector; and wherein the alignment portion is configured to be received in the panel opening with the dust plug coupled with a fiber optic connector.

* * * * *